US007661311B2

United States Patent
Houben et al.

(10) Patent No.: US 7,661,311 B2
(45) Date of Patent: Feb. 16, 2010

(54) MOULDED PART FOR CONNECTION TO A RIM WELL OF A WHEEL AND RIM WELL WHICH IS CONNECTED TO A MOULDED PART

(76) Inventors: Hans Houben, Flussweg 13, D-52146 Würselen (DE); Henning Von Watzdorf, Lichtenbergstrasse 41, D-71642 Ludwigsburg (DE); Martin Allgaier, Maulbronnerstrasse 11, D-751634 Ludwigsburg (DE)

( * ) Notice: Subject to any disclaimer, the term of this patent is extended or adjusted under 35 U.S.C. 154(b) by 292 days.

(21) Appl. No.: 10/549,373

(22) PCT Filed: Mar. 27, 2004

(86) PCT No.: PCT/EP2004/003276

§ 371 (c)(1),
(2), (4) Date: Sep. 14, 2005

(87) PCT Pub. No.: WO2004/085177

PCT Pub. Date: Oct. 7, 2004

(65) Prior Publication Data

US 2006/0177625 A1  Aug. 10, 2006

(30) Foreign Application Priority Data

Mar. 27, 2003  (DE) ............... 103 14 498

(51) Int. Cl.
*G01D 11/24* (2006.01)
(52) U.S. Cl. ................ 73/431; 301/5.21
(58) Field of Classification Search .......... 73/146, 73/146.2, 146.3, 146.4, 146.5, 146.8, 431, 73/866.5; 340/442–448; 301/5.21
See application file for complete search history.

(56) References Cited

U.S. PATENT DOCUMENTS

| 4,117,452 | A | * | 9/1978 | Snyder et al. ............... 340/443 |
| 4,316,374 | A | * | 2/1982 | Nagatsuma .................... 72/91 |
| 4,384,482 | A | * | 5/1983 | Snyder ..................... 73/146.5 |
| 4,507,956 | A | * | 4/1985 | Schlesinger et al. ........ 73/146.5 |
| 4,510,484 | A |   | 4/1985 | Snyder |
| 5,285,189 | A | * | 2/1994 | Nowicki et al. ............. 340/447 |
| 5,637,926 | A | * | 6/1997 | Zedonis ..................... 307/10.1 |
| 5,699,041 | A | * | 12/1997 | Ballyns ..................... 340/447 |
| 5,798,689 | A | * | 8/1998 | Huang ........................ 340/442 |
| 5,816,894 | A | * | 10/1998 | Hosozawa et al. ............ 451/28 |
| 5,838,229 | A | * | 11/1998 | Robinson, III .............. 340/442 |
| 5,900,808 | A | * | 5/1999 | Lebo .......................... 340/447 |

(Continued)

FOREIGN PATENT DOCUMENTS

CA  2209608 A1 *  1/1998

(Continued)

*Primary Examiner*—David A. Rogers

(57) ABSTRACT

There is described a shaped object adapted for being connected with a rim at a point located inside the rim well (7), having a contact surface (2) intended to rest on the rim well. It is provided according to the invention that the contact surface (2) intersects each of a set of mutually parallel first planes (3) along a curved curve (5), which is not merely an arc of a circle and whose distance from a second plane (6), that subdivides the contact surface (2) and that extends perpendicularly to the first planes (3) increases with a decreasing growth rate, at least in average, at least on one side of the second plane (6).

9 Claims, 4 Drawing Sheets

U.S. PATENT DOCUMENTS

| | | | |
|---|---|---|---|
| 5,945,908 A * | 8/1999 | Nowicki et al. | 340/447 |
| 5,956,820 A * | 9/1999 | Albinski | 340/442 |
| 6,175,301 B1 * | 1/2001 | Piesinger | 340/442 |
| 6,243,007 B1 * | 6/2001 | McLaughlin et al. | 340/447 |
| 6,549,125 B2 * | 4/2003 | Nigon et al. | 340/447 |
| 6,591,672 B2 * | 7/2003 | Chuang et al. | 73/146.8 |
| 6,672,150 B2 * | 1/2004 | Delaporte et al. | 73/146.2 |
| 6,694,807 B2 * | 2/2004 | Chuang et al. | 73/146.5 |
| 6,805,000 B1 * | 10/2004 | Sheikh-Bahaie | 73/146.8 |
| 7,017,403 B2 * | 3/2006 | Normann et al. | 73/146.2 |

FOREIGN PATENT DOCUMENTS

| | | |
|---|---|---|
| DE | 19626145 A1 | 7/1996 |
| DE | 19529289 A1 | 2/1997 |
| DE | 19626144 A1 | 1/1998 |
| EP | 0020150 A1 | 12/1980 |
| EP | 0751017 B1 | 6/1996 |
| EP | 0816137 A2 | 1/1998 |
| FR | 2839016 A1 | 10/2003 |
| JP | 11308738 A * | 11/1999 |
| JP | 2001354018 A | 12/2001 |
| JP | 2001194103 A * | 7/2007 |

* cited by examiner

MOULDED PART FOR CONNECTION TO A RIM WELL OF A WHEEL AND RIM WELL WHICH IS CONNECTED TO A MOULDED PART

Applicant claims priority from PCT Application number PCT/EP2004/003276 filed on 27 Mar. 2004 filed with the European Patent Office and German Application Number 103 14 498.6 filed on 27 Mar. 2003 filed with the German Patent and Trademark Office.

BACKGROUND OF THE INVENTION

1. Field of the Invention

The present invention relates to a shaped object adapted for being connected with a rim at a point located in the rim well, having a contact surface intended to rest on the rim well.

2. Description of Related Art

A shaped object known from EP 0 751 017 B1 has the form of a housing which contains a device for measuring the air pressure in a pneumatic tire mounted on the rim. The known housing is firmly connected with the base of a valve by screwing. The valve bore, through which air can be pumped into the tire, is configured for this purpose as a threaded bore, and the housing of the device for measuring the air pressure is provided with an oblong hole through which a hollow screw can be screwed into the thread of the valve bore. The screw is firmly tightened so that the housing is fixed on the base of the valve. The valve base is made from metal for this purpose and its outer shape is that of a spherical segment that fits into a recess in the housing of the device for measuring the tire pressure, which latter is designed as a complementary spherical cap for this purpose. In order to permit the housing to be supported on the rim well, the housing is provided on its side facing the rim well with two feet, which are provided with a contact surface that gets into contact with the rim well and by means of which the housing can be placed on the rim well. In order to ensure that the feet will actually reach the rim well even with rims of different shapes, the oblong hole permits the housing to be fixed on the valve base in different orientations relative to the lengthwise axis of the valve bore. This arrangement allows one and the same housing of the device for measuring the air pressure to be solidly mounted in wheels with rims of different configurations. However, it is a disadvantage of that arrangement that for mounting the housing an especially adapted valve is needed whose valve bore in the valve base is configured as a threaded bore for receiving a special screw with a through bore by means of which the housing can be screwed down on the valve base. The specially designed valve and the special screw with passage bore are expensive.

A wheel comprising a device for measuring the tire pressure is also known from DE 196 26 145 A1. In the case of that known wheel it is not the housing of the device for measuring the air pressure that is screwed down on the valve base, but rather a spring whose free end acts upon the housing so that the latter is clamped between the free end of the spring and the rim of the vehicle wheel in such a way that the housing comes to be supported, on the one hand, on the base of the rim well and, on the other hand, on two supporting points on the sidewall of the rim well. Thus, the spring urges the housing against both the bottom of the rim well and the sidewall of the rim well so that the housing is embraced by four sides, namely by the spring on two sides, by the rim well on one side and by the sidewall of the rim well on one side. It is a disadvantage of that arrangement that, just as in the case of the arrangement known from DE 0 751 017 B1, an expensive special screw with passage bore is required for fixing the spring on the valve base. And it is also a disadvantage that differently shaped springs are required for rims of different shapes to urge, and thereby fix, the housing against the rim.

It has also been proposed to fix the housing of a device for measuring the air pressure in pneumatic tires on the rim by means of a restraining strap that embraces the rim, lying on the rim well. However, such a restraining strap is connected with the disadvantage that a strap in combination with the necessary turnbuckle is relatively heavy, that for rims of different sizes it has to be individually shortened after tensioning, and that it may slacken under the influences of temperature and fatigue.

SUMMARY OF THE INVENTION

Now, it is the object of the present invention to open up a way how the housing, containing a device for measuring the air pressure in pneumatic tires, can be mounted on rims of pneumatic tires of different sizes at relatively low expense and with the least possible additional mass.

The shaped object according to the invention may be a housing, especially a housing intended to receive a device for measuring the air pressure and/or the temperature in the pneumatic tire. In this case, a negligibly small additional mass, if any, will be required for forming the contact surfaces. The housing may contain further components, especially a battery, a transmitter, a radio receiver, a roll sensor, a centrifugal sensor, and the like.

Instead of being configured as a housing the shaped object may also take the form of a carrier or a holder for an object to be mounted on the shaped object, especially a carrier or a holder for the housing of a device for measuring the air pressure in the pneumatic tire. The connection between the shaped object serving as carrier or holder, and the object received by it may be realized in different ways, according to considerations of expediency, for example by a substance connection, by screwing or by a form fit, for example by snapping it onto the shaped object. Even in case the shaped object is a carrier or a holder or a similar mounting aid, it can be produced with a minimum of mass, for example from a plastic material, so that no significant additional mass is added to the mass of the object to be mounted on the rim using such a carrier.

The invention provides substantial advantages:

A single shaped object can fit all imaginable rim types. There is nothing to be fixed on the valve.

Accordingly, there is no need for an expensive special valve, instead conventional low-cost valves may be used.

In configuring the shaped object, or the housing received by the shaped object, respectively, it is not necessary to consider the particular design of the valve.

The shaped object can be fixed at any desired point of the rim well, especially at a greater distance from the edge of the rim, at the lowest point of the rim well. This is favorable in that it helps prevent imbalances. And in addition, it also reduces the risk of damage to the shaped object, or to the object carried by the latter, during mounting of the tire.

For mounting purposes, a minimum of mass is required only.

The bonding surfaces can be optimized to achieve the highest possible tensile strength of the bond. The low cost of manufacture and mounting of the shaped object is unequaled.

By varying the size, inclination and/or radius of curvature of the contact surface, or of sections thereof, it is possible to optimize the bonding gap geometry for the stresses acting on the bond with different types of wheels.

The function and advantages of the invention will become more apparent when reading the following description of two especially preferred embodiments of the invention.

According to a first embodiment of the invention, the contact surface of the shaped object is configured in such a way that each of a set of mutually parallel first planes intersects the contact surface along a curve of concave shape exhibiting, at least on one side of a second plane that subdivides the contact surface and extends vertically to the first planes, a succession of curved sections whose radius of curvature decreases as the distance from the second plane rises. Within each curved section, the radius of curvature is preferably constant along the curve so that the respective curved section of the curve constitutes an arc of a circle. In the case of the described first embodiment, it is intended to give the curved sections a radius of curvature conforming with, or closely adapted to, the radius of curvature of the rim well of different rims on which the shaped object is to be mounted. In this case, there will then be a matching curved section of the contact surface, by which the shaped object can precisely apply itself to the rim well, for each rim well diameter. There will then exist a constant or substantially constant bonding gap between the contacting section of the shaped object and the rim well, which is especially well suited for achieving a strong bond and which easily can be given the necessary length to achieve the desired tensile strength of the bond.

A contact surface designed in this way adapts itself easily to rims of different sizes that differ one from the other with respect to the diameter of their rim well. Rims with the smallest rim well diameter apply themselves to one or two sections of the contact surface immediately adjacent the second plane; rims with a bigger rim well diameter will apply themselves to one or two sections of the contact surface further away from the second plane, the spacing between the sections and the second plane increasing with the diameter of the rim well. This allows a reliable substance connection, especially a bond between the shaped object and rims of different rim well diameters, it being now possible to obtain a sufficiently long bonding zone for all imaginable rim well diameters. This is so because the tensile stress admissible for a bonding agent depends on the height of the bonding gap, which should not exceed a maximum value depending on the nature of the bonding agent and on the tensile stress to which the bonding layer will be exposed and which is to be controlled. Supposing a cylindrical surface, for example a rim well, is to be connected with a flat section of a contact surface, the bonding gap starting at the point where the flat contact surface is in direct contact with the rim well will increase most rapidly for a rim well of the smallest diameter and the least rapidly for a rim well of the greatest diameter. For a bonding zone formed between a cylindrical rim well and a flat contact surface, the effective bonding zone, ending at the point where the height of the bonding gap reaches a predefined maximum, would be the smallest for the smallest rim well diameter and the greatest for the greatest rim well diameter. Compared with that situation, the invention permits the effective bonding zone to be extended especially for applications where the smallest rim well diameter is encountered and an extension of the bonding zone is most important.

Preferably, the sections of different radius of curvature follow each other directly so that the radius of curvature of the contact surface changes abruptly between two adjacent sections, while all in all a concave shape of the curve is maintained, with the distance of the curve from the "second" plane increasing in average over the respective curved sections. That configuration of the shaped object allows an especially short contact surface to be realized. However, if desirable for other considerations, there is also the possibility, instead of arranging the individual curved sections corresponding to the different rim well diameters directly adjacent one to the other, to provide a spacing between them in which case the surface areas bridging the spacing need not be involved in the bonding connection for any of the imaginable rim well diameters.

Even when sections of a contact surface, which are to be used for the substance connection with the rim well, are curved it is still possible, and of advantage, to make additional use of the sections adjoining the one section of the contact surface that is to apply itself against the rim well in realizing the bonding connection. This is of particular importance in cases where the contact surface is to fit a great number of rim wells of different diameters and where the different curved sections of the contact surface can be short only. The contact surfaces immediately adjacent the section of the contact surface that will establish direct contact, can then be additionally used to form a bonding connection with progressively increasing bonding gap. It is of advantage in those cases to make the first and the last end sections in the sequence of sections of the contact surface longer than the intermediate sections because the end sections have a neighboring section, which may contribute toward increasing the bonding section, only on one of their sides.

The curved sections of the contact surface may be equal or approximately equal in length. There is, however, also the possibility to purposefully select different lengths in order to optimize the sections for the stresses encountered at the bond with different rims. For example, it may be of advantage to make the sections longer for smaller diameters of the rim well they are to fit so that the section being the closest to the second plane exhibits the greatest length. Since the abrupt change in radius of curvature encountered between adjacent sections of the contact surface is the greatest in the neighborhood of the second plane, the contribution which the section neighboring another section, which fits a given rim, can provide to the effective length of the bonding gap is smaller in the neighborhood of the second plane than in the case of sections that are further remote from the second plane. In order to compensate for that disadvantage, it is of advantage if the section being the closest to the second plane is given the greatest length.

Conveniently, the number of the curved sections on the respective side, especially on both sides of the respective plane, should be suitably selected for those rim well diameters which the shaped object is to fit.

According to a second embodiment of the configuration of the contact surface, the latter intersects each of a set of mutually parallel first planes along a concave curve which has at least one section, whose radius of curvature progressively decreases as the distance from the second plane rises, on at least one side of the second plane that subdivides the contact surface and that extends perpendicularly to the first planes. This configuration is achieved by an arrangement where, starting from the configuration according to Claim 3, the number of curved sections of a contact surface of predefined length tends toward infinite. This shows that both embodiments are based on a common inventive idea.

In the case of the second embodiment, where the contact surface has a continuously changing radius of curvature, the radius of curvature should decrease, as the distance from the second plane rises, over its full length at least on one of the two sides of the second plane. Preferably, however, the contact surface of that embodiment should—just as preferred for the first embodiment—also present the claimed radius of curvature shape on both sides of the second plane so as to allow a similar, especially symmetric contact with differently shaped rim wells on both sides of the second plane. This latter aspect is of special advantage as it minimizes the occurrence of torques acting on the bonding layer.

Generally, it is possible to give the contact surface a different, especially simpler, configuration on one side of the second plane than on the other side of the second plane, for example by providing only a single flat contact surface on one side of the second plane, although this is not preferred, preference being given to a symmetrical design. There is further the possibility to use a mixture of the two embodiments in configuring the contact surface. The first embodiment, using a sequence of arc-shaped sections of the contact surface with different radius of curvatures is especially suited in cases where the rims, which the shaped object is to fit, has a rim well with very narrow dimensional tolerances. This is however not the rule at present. If greater dimensional tolerances exist in the rim well, then the second embodiment according to Claim 8 will be more suitable and is, therefore, preferred.

Dimensional tolerances are encountered not only in the circumferential direction of the rim, but also in its transverse direction. In particular, it cannot be assumed that the rim well will always have a cylindrical shape. According to a preferred further development of the invention, it is therefore provided that the contact surface extends in convex shape along the lines of intersection with third planes that intersect the curve perpendicularly. A rim well of exactly cylindrical shape throughout would be most suited for achieving an optimum bonding surface, as the lines of intersection would be straight, not convex, in this case. Given the fact, however, that in practice one cannot always start from cylindrical rim wells, and considering that a sufficiently large bonding surface is to be achieved with one and the same shaped object and a plurality of rim well forms, a favorable compromise will be achieved if the contact surface extends in convex shape along the lines of intersection with the third planes that intersect the before-mentioned curve at a right angle. The lines of intersection with the third planes may be constituted by a sequence of straight sections forming a polyline in which the angle between successive sections increases from one end of the polyline to the other end of the polyline. However, the lines of intersection may also be curved by sections or continuously, with the radius of curvature preferably increasing from one end to the other end of the line of intersection. Such an asymmetric contour which—relative to the rim—extends in transverse direction of the rim is especially well suited for fixing the shaped object with sufficient reliability also on rims with high dimensional variation and on rims with a non-cylindrical rim well, maybe even on the edge of the rim well where the latter starts to transition to a shoulder. The contact surface of a shaped object developed in this way resembles the shape of half a saddle.

Suitable materials for the substance connection between the shaped object and the rim are, above all, bonding agents, especially curable bonding agents, such as two-component epoxy resins and two-component SE polymers, which allow bonding gaps up to a height of at least 1 mm to be realized. Although cold hardening bonding agents are preferred for reasons of process economy, it is of course also possible to use hot-curing bonding agents. Adhesion of the bonding agents can be improved by a suitable configuration or pre-treatment of the bonding surfaces in a way known as such, for example by roughening, etching and structuring of the bonding surfaces, or by undercuts.

BRIEF DESCRIPTION OF THE FIGURES

A substance connection can also be realized by metallurgical means, however, such a solution would be more expensive compared with a bonding connection.

Certain embodiments of the invention are shown diagrammatically in the drawings where the dimensional relations have been exaggerated to make the essential features of the invention more apparent. Identical parts, or parts that correspond one to the other, are indicated in the different examples by the same reference numerals.

DETAILED DESCRIPTION OF THE INVENTION

Figure 1:
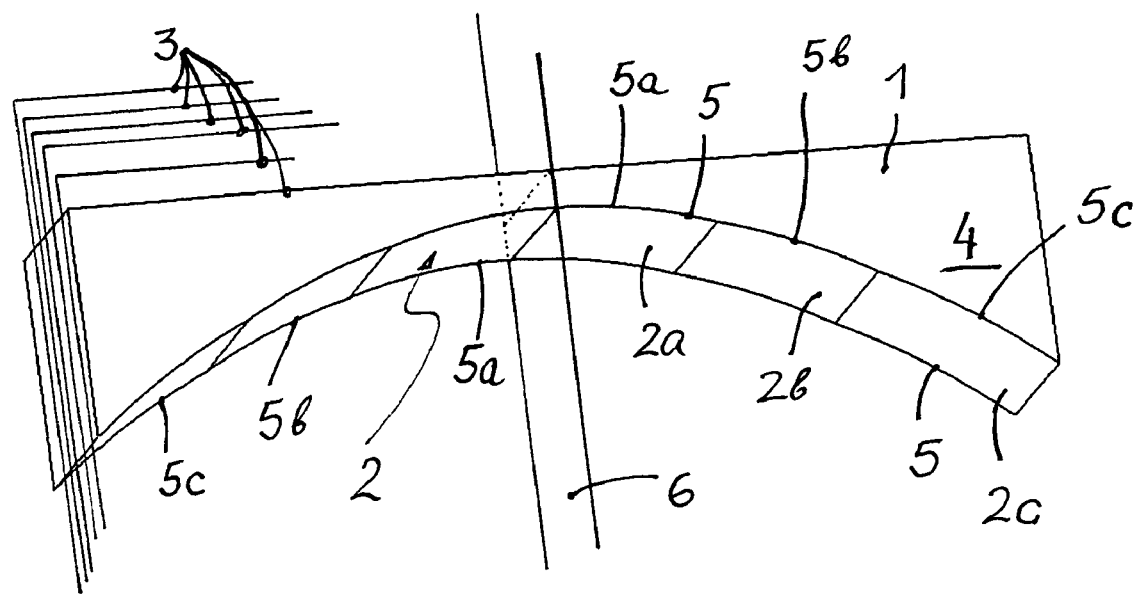
FIG. 1 shows an oblique view of a shaped object with a contact surface comprising a sequence of differently curved sections.

The shaped object 1 illustrated in FIG. 1 has a contact surface 2 of generally concave shape. A set of first planes 3, which extend in parallel one to the other and one of which coincides with the forward lateral surface 4 of the shaped object, intersects the shaped object along curves 5 which comprise a sequence of sections 5a, 5b, 5c that are differently curved in such a way that starting from section 5a, which is the nearest to a second plane 6 that intersects the planes 3 at a right angle and that subdivides the contact surface 2, the radius of curvature decreases as the distance from the second plane 6 increases so that the section 5a has the smallest radius of radius of curvature while the section 5c has the greatest radius of radius of curvature. As a result, the contact surface 2, on both sides of the second plane 6, consists of a sequence of differently curved sections 2a, 2b and 2c directly following each other. In the illustrated example, each of the sections 2a, 2b and 2c constitutes a section of a cylinder envelope.

The arrangement is mirror-inverted, relative to the second plane 6, so that the section 2a of the contact surface extends without a transition from the one side of the second plane 6 to the other side of the second plane 6 and the other sections 2b and 2c follow it toward the outside. The sections 2b and 5b, respectively, indicated by the same reference numerals on different sides of the second plane 6, have the same radius of curvature and the same center of radius of curvature, the latter lying on the second plane 6. The same applies correspondingly to the remaining sections 5c and 2c, respectively, indicated by the same reference numerals.

Figure 2:
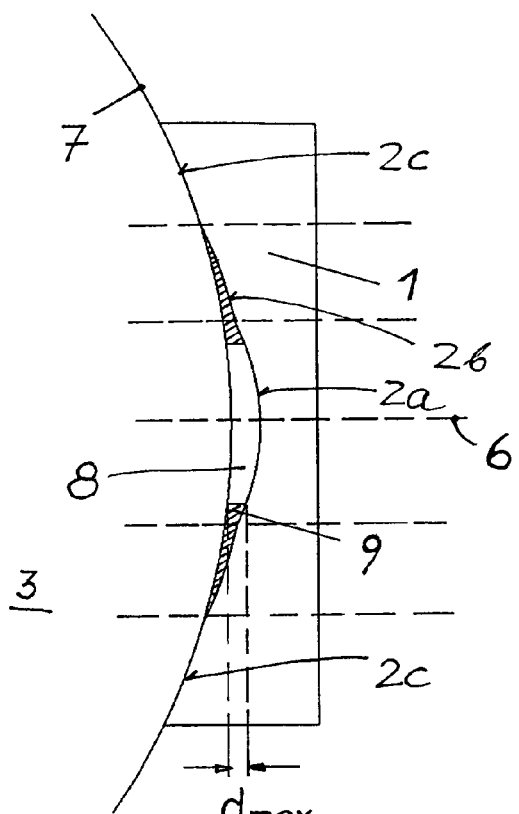
FIG. 2 shows a side view of the shaped object of FIG. 1, applied to a rim well of big diameter.

If a shaped object of the kind illustrated in FIG. 2 is applied to a cylindrical rim well 7 of big diameter, then the shaped object 1 can apply itself snugly to the rim well 7 by the outer sections 2c of the contact surface 2. When the shaped object 1 is bonded to the rim well 7, a bonding layer of substantially constant layer thickness can form in the area of section 2c of the contact surface. Starting at the edge of the outer section 2c, a gap 8 will open in the direction of the second plane 6 between the rim well 7 and the contact surface 2, which up to a maximum height dmax, which depends on the nature of the bonding agent and on the required tensile strength of the bond, contributes to the required tensile strength of the bond when filled with bonding agent up to the height dmax of the gap. This zone, reaching to the height dmax of the gap, is described herein also as bonding zone 9.

Figure 3:
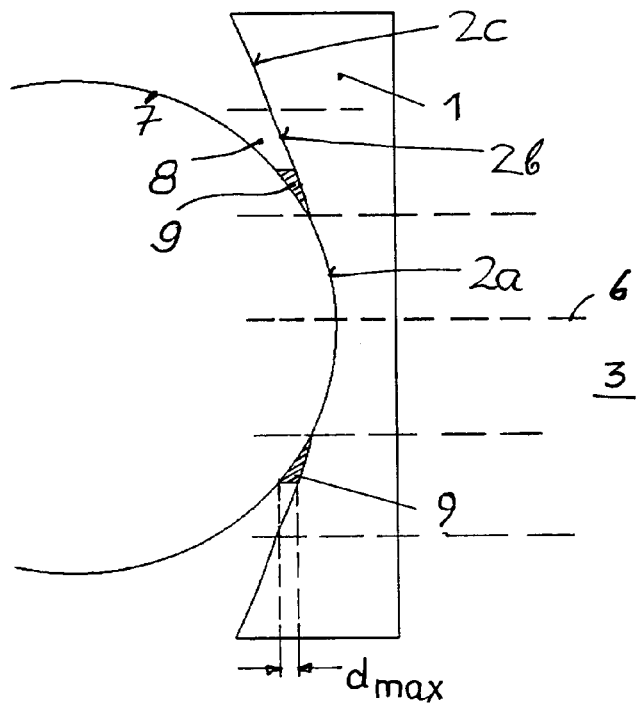
FIG. 3 shows a side view of the shaped object of FIG. 1, applied to a rim well of small diameter.

When the shaped object 1 according to FIG. 3 is applied to a rim well 7 of smaller diameter, then the inner section 2a of the contact surface can apply itself snugly to the rim well 7 and the bonding zone extends a certain length beyond that contact area on both sides of the section 2a into the area of the section 2b.

In the case of a rim of mean diameter, the shaped object 1 can adapt itself snugly to the rim well 7 by the sections 2b of its contact surface 2. In that case, the bonding zone 9 can extend into the neighboring sections 2a and 2c, on both sides of each of the sections 2b, until a predefined maximum width dmax of the gap is reached.

What has been illustrated in FIGS. 1 to 3 for three sections of different radii of radius of curvature can be extended to a larger number of different radii of radius of curvature, depending on the number of different rim well diameters which the shaped object 1 is to fit.

Figure 4:
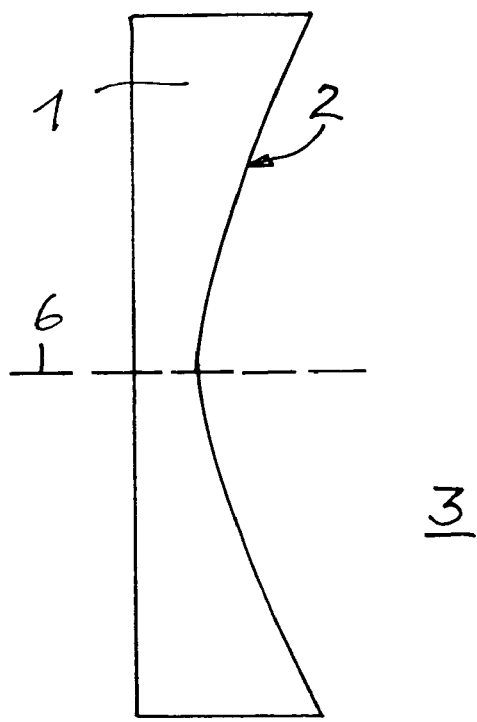
FIG. 4 shows a side view of a shaped object, where the radius of curvature of the contact surface varies continuously.

FIG. 4 shows a side view of an embodiment of the shaped object 1 where the contact surface 2 exhibits a continuously varying radius of curvature, resulting as a borderline case from the first example if the number of discrete sections 2a, 2b, 2c of the contact surface is selected to tend toward infinite over the predefined overall length of the contact surface 2.

Figure 5:
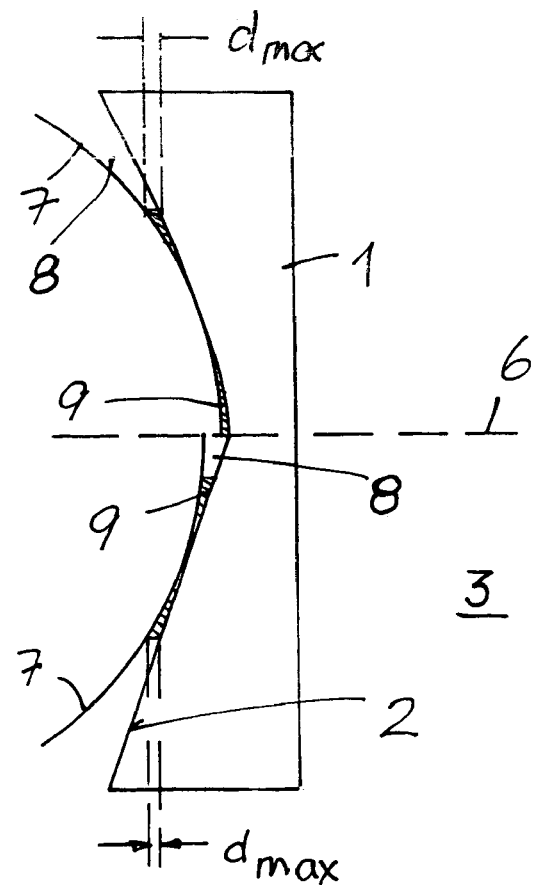
FIG. 5 shows a side view of a modification of the shaped object illustrated in FIG. 4.

Compared with the embodiment illustrated in FIG. 4, the embodiment illustrated in FIG. 5 is modified in that—just as in the example of FIG. 4—the radius of curvature of the curve 5 on the one side of the second plane 6 decreases continuously as the distance from the second plane 6 rises, whereas the contact surface 2 on the other side of the second plane 6 follows a straight line. This comparison shows that the length of the connection zone 9, up to the point where the maximum height dmax of the gap is reached, is clearly shorter in the area where the contact surface has straight boundary lines than on the other side of the second plane 6.

FIGS. 6 to 11 illustrate the adaptation of the contact surface 2 to a rim well 7 in a third plane, in which the axis of rotation of the rim is located, i.e. in a radial plane of the rim. That third plane is the plane of projection in each of FIGS. 6 to 11, while in FIGS. 2 to 5 it extends perpendicularly to the plane of projection. Given the fact that it is only the shape of the two surfaces of the rim well 7 and of the shaped object 1 facing each other that matter for purposes of the present discussion of the existing relationships, both the rim well 7 and the shaped object 1 are shown in a very simplified block form only.

Figure 6:
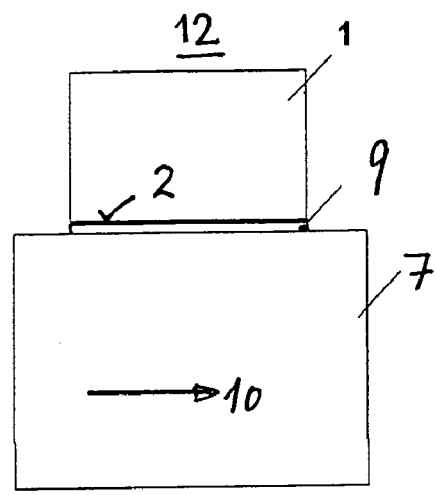
FIGS. 6 to 11 show radial sections of molded parts applied to a rim well, represented as a radial section relative to the axis of rotation of the rim, representing different contours of the rim well and of the contact surface of the shaped object.
Figure 7:
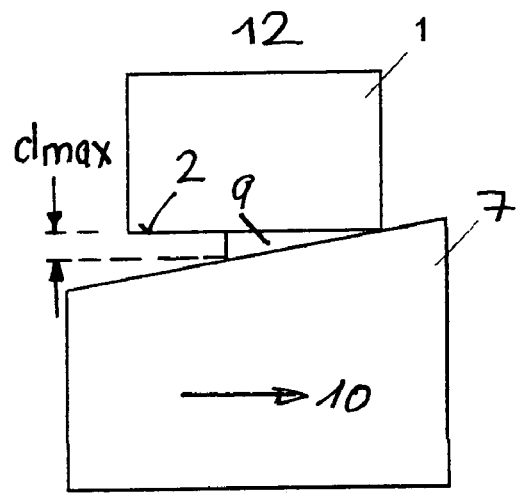
Figure 8:
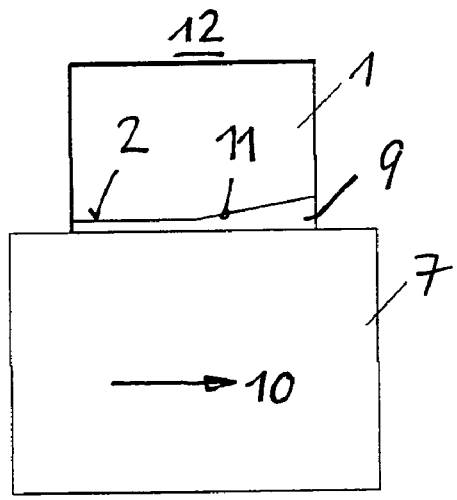
Figure 9:
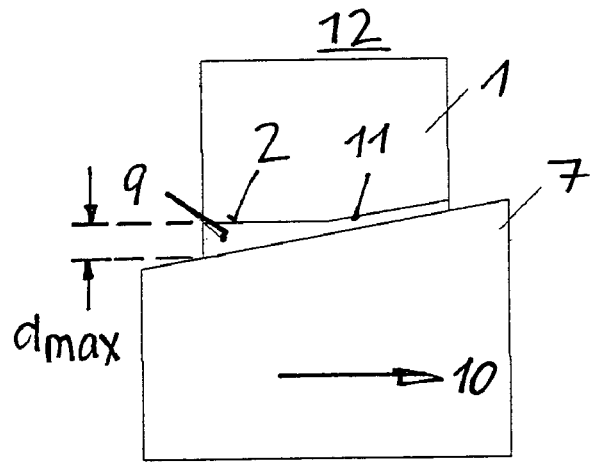

FIG. 6 illustrates the case where the rim well 7 has a cylindrical shape in the area in which it is in contact with the shaped object 1. In a transverse direction 10 of the rim well 7, extending in parallel to the axis of rotation of the rim, a connection zone 9 of constant gap height can then be obtained if the contact surface 2 consists—as illustrated for the previous embodiments—either of cylindrical sections (FIGS. 1 to 3) or of flat sections or generally of sections with straight border lines in the transverse direction 10. Unfortunately, however, this frequently is not the case. The rim well 7 often has a conical shape, as illustrated in FIG. 8. In such a case, the effective connection zone 9, up to the gap height dmax, is then more or less reduced, depending on the cone angle. This is undesirable. In can be counteracted by giving the conical surface 2 in the transverse direction 10 the configuration of a polyline, instead of the straight boundary line illustrated in FIGS. 6 and 7, with the result that the contour of the contact surface 2 becomes more or less convex in the transverse direction 10. The simplest example of such an arrangement, in which a polyline consists of two straight sections, is illustrated in FIGS. 8 and 9. It can be seen in those Figures that although the connection zone 9 is shortened in transverse direction 10 in the case of a rim with an exactly cylindrical rim well 7, this disadvantage is, however, balanced out by the fact that the length of the connection zone 9 increases, compared with the case illustrated in FIG. 8, when a shaped object 1 of that configuration is bonded to a conical rim well 7—see FIG. 9. Bending the contact surface 2 off in transverse direction 10 therefore constitutes an advantageous compromise between the boundary cases illustrated in FIGS. 6 and 7.

Figure 10:
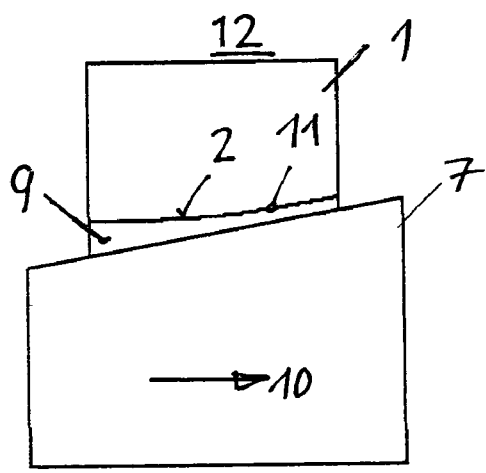
Figure 11:
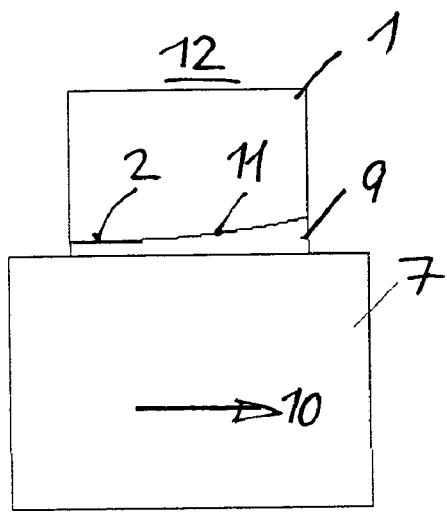

The development of the contact surface 2 in transverse direction 10 can be optimized if the contact surface 2 is not simply bent off, as illustrated in FIGS. 8 and 9, but if instead a polyline is used to give it a contour, represented by the line of intersection 11 with the third plane 12, of the kind illustrated in FIGS. 10 and 11 where the radius of curvature increases in average from one end of the shaped object 1 (the left edge in FIG. 10) toward the opposite edge of the shaped object 1. Instead of a polyline, the line of intersection 11 may also be given a continuous radius of curvature, approximated to it in transverse direction 10. The contour of the contact surface 2 then resembles that of half a saddle. It is the optimum achievable if one and the same shaped object 1 is to be used for a large number of different rim wells.

LIST OF REFERENCE NUMERALS

1. Shaped Object
2. Contact surface
2a. Section
2b. Section
2c. Section
3. First planes
4. Lateral surface
5. Curve
5a. Section
5b'. Section
5c. Section
6. Plane
7. Rim well
8. Gap
9. Connection zone
10. Transverse direction
11. Polyline
12. Third plane

The invention claimed is:

1. A shaped object, in combination with a rim of a wheel, said shaped object located inside the rim's well, having a contact surface intended to rest on the rim well, wherein the contact surface intersects each, of a set of mutually parallel first planes along a curved surface which is generally elliptical, said curved surface having a radius of curvature which has a curvature growth rate, wherein the growth rate decreases to a limit value as the distance of the curve from a second plane rises, and then remains constant as the distance continues to rise.

2. The shaped object as defined in claim 1, wherein the shaped object is attached to the rim well by a bonding agent between the contact surface and the rim well.

3. The shaped object as defined in claim 1, wherein it is a carrier or a holder for a housing.

4. The shaped object as defined in claim 1, wherein it is a housing.

5. The shaped object as defined in claim 4, wherein the housing contains a device for measuring the pressure and/or the temperature in a pneumatic tire which is mounted on the rim.

6. A rim with a shaped object as defined in claim 1, which has its contact surface connected with the rim at a point inside the rim well by a substance connection.

7. A rim as defined in claim 6, wherein the shaped object is bonded to the rim well.

8. A Shaped Object adapted for being connected with a rim at a point located inside the rim well, as according to claim 1, wherein the Shaped Object is attached to the rim well by a bonding agent between the contact surface and the rim well.

9. A Shaped Object as defined in claim 8, wherein said bonding agent is a durable bonding agent.

* * * * *